United States Patent [19]
Faerber et al.

[11] Patent Number: 4,971,231
[45] Date of Patent: Nov. 20, 1990

[54] STORAGE VESSEL FOR BEVERAGE CONCENTRATES FOR USE IN BEVERAGE DISPENSERS

[76] Inventors: Karlheinz Faerber, Giegerweg 1, 7928 Gien/Gen Brenz; Anton Deininger, Vogstrasse 20, 8887 Bach Hagel; Rolf Preuss, Bergstrasse 56, 2418 Ratzeburg; Georg Plester, Rheinstrasse 79, 4300 Essen 18; Georg Troska, Erlenstrasse 23, 4352 Herten; Manfred Guenther, Elfriedenstrasse 14 d, 4300 Essen, all of Fed. Rep. of Germany

[21] Appl. No.: 189,826

[22] Filed: May 3, 1988

[51] Int. Cl.$^5$ .............................................. B67D 5/02
[52] U.S. Cl. ................................ 222/559; 222/504; 222/541
[58] Field of Search .................. 222/1, 129.1–129.4, 222/438, 440, 451, 453, 504, 80, 87, 105, 567–568, 545, 559

[56] References Cited

U.S. PATENT DOCUMENTS

| 4,109,829 | 8/1978 | Kuckens et al. | 222/81 |
| 4,509,690 | 4/1985 | Austin et al. | 239/429 |
| 4,533,070 | 8/1985 | Deininger et al. | 222/439 |
| 4,667,853 | 5/1987 | Krüger | 222/80 |
| 4,708,263 | 11/1987 | le Granse | 222/1 |

FOREIGN PATENT DOCUMENTS 1005693 9/1965 United Kingdom ............... 222/504

Primary Examiner—Michael S. Huppert

[57] ABSTRACT

An apparatus for the metered dispensing of beverage concentrate includes a storage container with a discharge opening and a dosing chamber assembly attached to the discharge opening. The dosing chamber assembly includes a chamber housing with an input opening communicating with the discharge opening of the container, an output opening and a sliding control valve displaceable in the chamber to alternately open and close the input and output openings of the chamber housing. The container includes an outer rigid shell and a flexible foil bag therein which varies in volume with pressure changes therein.

8 Claims, 2 Drawing Sheets

FIG. 1
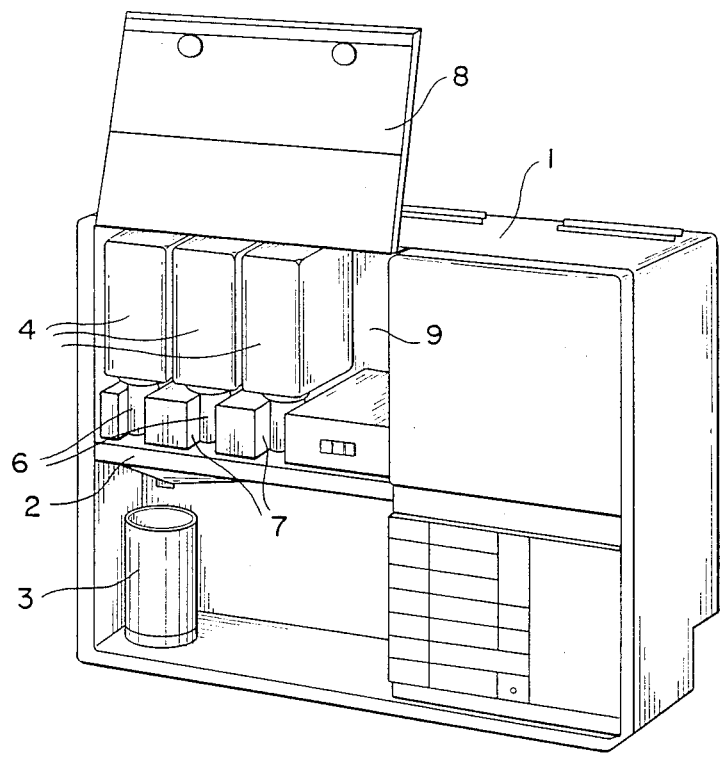
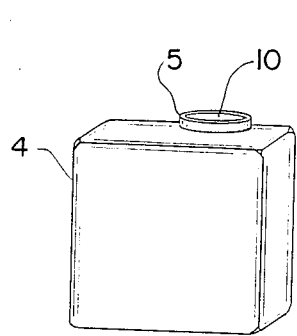
FIG. 2
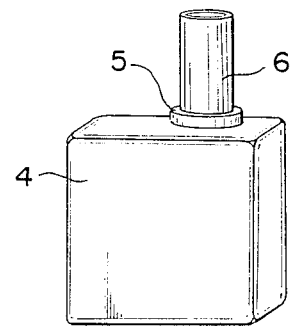
FIG. 3

4,971,231

STORAGE VESSEL FOR BEVERAGE CONCENTRATES FOR USE IN BEVERAGE DISPENSERS

BACKGROUND OF THE INVENTION

The present invention relates to a proportioning chamber/dispenser fixture for storage vessels, more particularly for sliding control valves unitized with a proportioning chamber housing, by means of which input-side and output-side openings can be closed alternatively be closed.

As an example, these arrangements are preferably used in beverage dispensers, by means of which carbonated water is mixed with beverage concentrates for a refreshment drink. Storage vessels for the beverage concentrates are usually fabricated from a dimensionallly stable and gas-tight material, and are shaped like a bottle or cuboid. When installed in a beverage dispenser, these storage vessels are positioned with their discharge opening downward. Attached to this discharge opening is a proportioning chamber/dispenser fixture with input side and output-side discharge openings that can be closed alternately by means of a sliding control valve. The liquid (beverage concentrate) flows by gravity from the storage vessel into the proportioning chamber/dispenser fixture, when that fixture's input-side discharge opening is opened. When this input-side discharge opening is closed by the sliding control valve and, at the same time, the output-side discharge opening is opened, the liquid—likewise by gravity—emerges from the proportioning system, so that the quantity of liquid is essentially determined by the proportioning-chamber capacity.

In the prior art proportioning chamber/dispenser fixtures, however, leakage between the sliding control valve and the proportioning-chamber housing can influences the quantity dispensed in a manner difficult to control. Design of a guideway between the sliding control valve and the proportioning-chamber housing, which is as free of gaps as possible to avoid these leakages, is highly problematical, since this sliding control valve is supposed to be axially movable with the greatest possible ease inside the proportioning-chamber housing, so it can be reliably adjusted, in the form of a solenoid plunger, by an electrically generated magnetic field. This method of adjustment requires no mechanical linkages, so that replacement of the proportioning chamber/dispenser fixtures in the beverage dispenser, together with the storage vessels, can be carried out with ease.

It is possible to ventilate the head room of this storage vessel or a buffer space therewithin (DE OS No. 25 44 671) in order to ensure that the flow of liquid is not hampered by volume-equalizing air counterflows and by the subatmospheric pressure developing. These measures require additional technical effort, yet they have not proven to be advantageous, since the air in the head room of the storage vessel easily escapes therefrom to enter the head room of the storage vessel during the flow of the liquid. In the prior art systems, it has even turned out to be expedient to cause a build-up of subatmospheric pressure in the head room so as to counteract the leakage flows between the metering plunger and the wall of the proportioning-chamber housing. However, the pressure in a dimensionally stable storage vessel is dependent on external influences, especially on the response to temperature changes during intermittent cooling.

SUMMARY OF THE INVENTION

Therefore, the primary object of the present invention is the provision of a proportioning chamber/dispenser fixture by means of which exact proportionings of the volumes dispensed are made possible, independently of environmental influences. These high proportioning accuracies are required, for example, in beverage dispensers for the beverage constituents so as to ensure reproducible mixing ratios.

A design which meets these requirements is characterized, according to the invention, by placing the input-side discharge opening in the proportioning chamber/dispenser fixture in the center of the head room of this proportioning chamber/dispenser fixture, and by mounting opposite this discharge opening on the tubular sliding valve a valve-sealing disc, by means of which the discharge opening can be closed in lid fashion, in the direction of movement of the sliding control valve, against the whole interior of the proportioning-chamber housing. This step practically ensures that the liquid from the storage vessel will continue to flow across leakage flows that cannot be controlled. As a result, the pressure within the storage vessel will no longer have any effect whatever on the quantity of liquid being dispensed. The amount of liquid dispensed is only determined in accordance with the actual volume defined by the proportioning-chamber housing.

Often it is necessary, or only useful, to cool beverage-concentrate vessels in a beverage dispenser. As a rule, the cooling phasese occur intermittently. The temperature in the storage vessel fluctuates during the intermittent cooling phases contingent upon the measuring and cooling technologies. This can cause pressure fluctuations in storage vessels designed with dimensional stability. By using flexible foil sacks for the input of the liquids dispensed in measured portions, volume equalization is provided to prevent significant variations of the inner pressure in the storage vessel. However, the special design of the proportioning chamber/dispenser fixture with the input-side discharge opening located in the center of the head room and closable in lid fashion by the valve-sealing disc of the sliding control valve also ensures that the pressure differences within the storage vessel will not have any effect on the metered quantities.

According to a preferred embodiment, the proportioning chamber/dispenser fixture of the arrangement incorporating the invention is characterized by the mounting, on the valve-sealing disc, of guide ribs that project into the input-side discharge opening of this propotioning chamber/dispenser fixture. This lengthens in an axial direction the guideway for the sliding control valve to the input-side discharge opening of the proportioning chamber/dispenser fixture.

According to another preferred embodiment, longitudinally directed guide ribs are mounted between the outer jacket of the tubular sliding control valve and the cylindrical wall of the proportioning chamber/dispensing fixture. Thereby, the gap between the sliding control valve and the wall of the proportioning-chamber housing can be enlarged sufficiently without the risk of tipping the sliding control valve in the proportioning chamber, thereby reducing the friction between this sliding control valve and the proportioning-chamber housing. From a manufacturing viewpoint, it is advantageous to install the longitudinally directed guide ribs on the other jacket of the tubular sliding control valve.

It is desirable that the main components of the proportioning chamber/dispenser fixture be standardized and that the working stroke of the sliding control valve be made of uniform length as well. This step is of great importance for use in beverage dispensers, in which a magnetic flux generated by an electromagnet system in the apparatus housing controls the sliding control valve actuated as a solenoid plunger. By standardizing the components and making the working strokes of uniform length, the magnetic flux to be generated can be standardized as well. Nevertheless, there must be an option to meter differing quantities of liquids on account of the different natures of the liquids to be metered, namely, the different beverage concentrates. Depending on the particular type of beverage concentrates used, different mixing ratios are required with the other component, namely, the carbonated water.

To obtain these differing metered quantities, and nevertheless to be able to fall back on a proportioning system that is as unitized as possible, it is advantageous within the scope of this invention, to design the system in such a way that the input-side discharge opening lies in a proportioning-chamber cover detachably fixed to the proportioning chamber/dispenser fixture with side walls that surround the inner volume. Without requiring the stroke range of the sliding control valve to be changed, the inner volume of the whole proportioning chamber/dispenser fixture can be variably and properly adjusted according to the concentrate used by appropriately expanding or contracting the shapes of these sidewall areas. If the housing cover of the proportioning chamber/dispenser fixture is structurally integrated into the connecting pipe socket of the liquid container, a direct relationship is achieved between the kind of beverage concentrate and the metered quantity.

In order, on the one hand, to offer a good possibility of carrying out the volume proportioning by means of the proportioning chamber/dispenser fixture dependent on the nature of the liquid stored in the storage vessel and, on the other hand, to provide protection against improper use of the storage vessel, it is advantageous to integrate a part of the proportioning chamber/dispenser fixture, namely the input-side area, into the connecting pipe socket of the storage vessel through the discharge opening closable by the regulator piston. This area is so designed that, once connected to the main parts of the proportioning chamber/dispenser fixture, it is no longer usable. Before connecting these proportioning chamber components, the dispensing opening of the connecting pipe socket is firmly sealed with a foil cap.

BRIEF DESCRIPTION OF PREFERRED EMBODIMENTS

Details of the design incorporating the invention will now be described, reference being had to the practical embodiment shown in the drawings, in which:

FIG. 1 is a perspective view of a beverage dispenser with storage vessels for beverage concentrates;

FIG. 2 and

FIG. 3 are perspective views of storage vessels for liquids with and without a proportioning chamber/dispenser fixture;

FIG. 5 and

Figure 6:
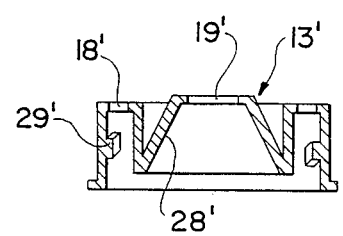

FIG. 6 are various designs of input-side housing covers for the proportioning chamber/dispenser fixture.

The beverage dispenser depicted in FIG. 1 serves to mix water, kept on hand in the apparatus housing, enriched with $CO_2$ gas and cooled, with a beverage concentrate within a mixing trough 2, and to dispense the resulting refreshment drink into a drinking vessel. To enable production of differnet sorts of refreshment drinks, in the present case three types of beverage concentrates are stored in three storage vessels 4 installed in the beverage dispenser above the mixing trough 2, such that the dispensing openings are directed downward. On an connecting pipe socket 5, each of these storage vessels 4 is assigned a dispensing opening of a proportioning chamber/dispenser fixture 6. This proportioning chamber/dispenser fixture contains a sliding control valve provided with a ferromagnetic armature. In the housing 1 are installed electromagnets which can generate a magnetic field in the area of the locating slot 7 for the proportioning chamber/dispenser fixture 6, through which the sliding control valve is influenced inside the proportioning chamber/dispenser fixture. Thereby, a metered serving of beverage concentrate is fed to the mixing trough 2 in which the mixing operation is carried out with carbonated water likewise metered into the mixing trough 2. The housing chamber, closable with a cover 8 and in which the storage vessels 4 are accommodated, is connected to the refrigerating circuit of a refrigerating plant, so that the beverage concentrates are stored cold, and thus stand ready for the mixed drink.

FIG. 2 shows a storage vessel 4 for liquid concentrates as it feeds from filler to user. The dispensing opening in the connecting pipe socket 5 is sealed by a foil cap 10. FIG. 3 shows a storage vessel 4 for a beverage concentrate with the proportioning chamber/dispenser fixture mounted on the connecting pipe socket 5.

Figure 4:
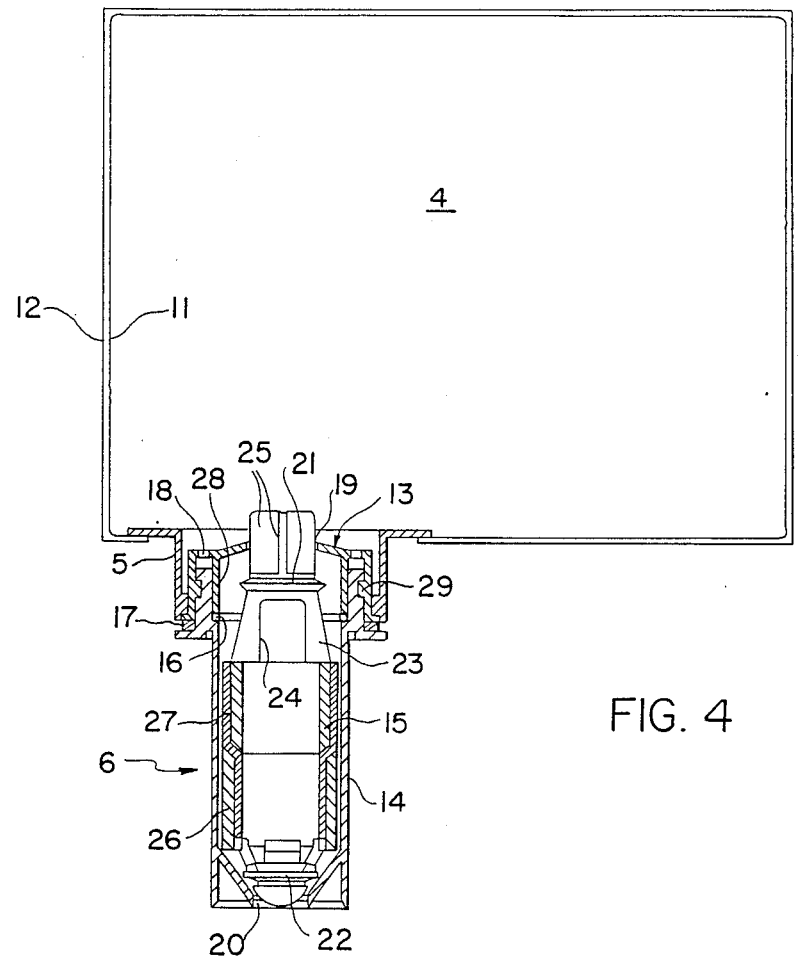
FIG. 4 is a sectional elevational view of a storage vessel for beverage concentrates with a proportioning chamber/dispenser fixture attached thereto.

The storage vessel 4 and details of the proportioning chamber/dispenser fixture for beverage concentrates are apparent from the sectional elevational view shown in FIG. 4. The storage vessel 4 is designed essentially as a dimensionally stable cuboid. In the area of its dispensing opening, the container wall changes into the dimensionally stable connecting pipe socket 5, to which is attached the proportioning chamber/dispenser fixture.

The proportioning chamber/dispenser fixture 6 is formed by an input-side proportioning-chamber housing 14 widened out with a housing cover 13 and in which is installed a tubular sliding control valve 15 which is vertically adjustable.

The housing cover 13 is a component of the connecting pipe socket 5 of the storage vessel 4 integrated into the mounting system. The housing 14 of the proportioning chamber/dispenser fixture is connected to the housing cover 13 by short screw threads 29 distributed along the circumference and sealed by a packing plate 16 against this housing cover 13. The seal ring 17 is provided for sealing against the atmosphere because, for reasons of production engineering, openings 18 are provided in the upper closure wall of the housing cover 13 for producing the screw threads 29.

In the proportioning chamber/dispenser fixture 6 with the substantially rotationally symmetrical design, the input-side discharge opening 19 is arranged axially central in the housing cover 13 and the output-side discharge opening 20 at the lower end of the proportioning-chamber housing 14. Opposite these discharge openings 19 and 20, there is carried on the sliding control valve 15 valve-sealing discs 21 and 22, which alternately close the input-side discharge opening 19 or, as shown in FIG. 4, the output-side discharge opening 20, depending on the vertical end position of the sliding control valve 15. The sliding control valve 15 has a substantially tubular form and carries an input-side valve-sealing disc 21 in a cylindrical attachment 23 with holes 24. Projecting above this valve-sealing disc 21 are cross-shaped guide ribs 25 acting as guiding elements into the input-side discharge opening 19. The sliding control valve 15 has a ring 26 of ferromagnetic material, which, as a solenoid plunger inside an electromagnet system installed in the apparatus housing, is influenced by induction of a magnetic field, such that the sliding control valve is lifted from the position shown, in which the output-side discharge opening 20 is closed, to the upper position, in which the input-side discharge opening 19 is closed. On the peripheral surface of the sliding control valve 15, there are arranged longitudinally running guide ribs 27, so that good anti-friction properties are provided between the sliding control valve 15 and the wall of the proportioning-chamber housing 14.

In the position of the sliding control valve 15 shown in FIG. 4, beverage concentrate stored in storage vessel 4 can flow into the interior of the proportioning chamber/dispenser fixture 6 through its input-side discharge opening 19 by gravity fed. The air volume present in the proportioning chamber/dispenser fixture 6 flows into the storage vessel 4. Due to the fact that this incoming air is originally warmer than the normally cooled beverage concentrate being dispensed, a volume deficit develops in the storage vessel 4 after this air is cooled, which, however, does not deleteriously affect the proportioning accuracy when use is made of the proportioning chamber/dispenser fixture embodying this invention. Likewise, temperature differences and, thereby, volume changes in the storage vessel 4 do not have deleterious effects because of intermittent cooling processes.

By creating a magnetic field with the electromagnet system installed in the apparatus housing 4, lifting power is exerted on the ferromagnetic ring 26 of the sliding control valve 15. As a result, the input-side discharge opening 19 is closed by the valve-sealing disc 21, so that no more beverage concentrate can get into the proportioning chamber/dispenser fixture 6 from the storage vessel 4, while the output-side discharge opening 20 is opened and the quantity of beverage concentrate found originally in the proportioning chamber/dispenser fixture 6 can exit. The volume flowing out is replaced in the proportioning chamber/dispenser fixture 6 by air. By means of this proportioning chamber/dispenser fixture 6, a high degree of accuracy is achieved in the dispensed volume of concentrate. This accuracy is of the greatest importance in achieving an optimum mixture ratio with the carbonated water that is also introduced into the mixing channel 2.

Figure 5:
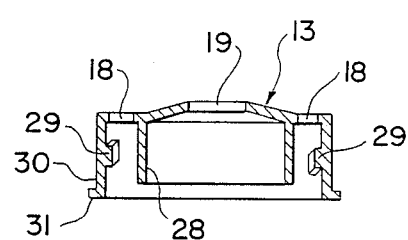

Differing beverage concentrates require differing metered quantities. In order to meet this requirement with a proportioning chamber/dispenser fixture which is standardized with respect to the essential structural parts, the technical effort for producing the different variants is reduced to the different shapes of the side walls 28 of the housing cover 13. FIG. 5 shows the same housing cover 13 as in FIG. 4, while FIG. 6 shows a housing cover 13' with beveled walls 28', which taper off toward the discharge opening 19'. Thus, compared to the use of the housing cover 13 shown in FIG. 5, if the housing cover 13' is constructed as in FIG. 6, a volume change results in this area and thereby for the whole proportioning chamber/dispenser fixture 6. Since these housing covers 13 or 13' are integrated into the connecting pipe sockets 5 of the tank 4, a direct relationship is achieved with respect to the nature of the beverage concentrate used. Further volume reduction in the proportioning chamber/dispenser fixture 6 is possible by introducing an additional pipe inlet into the regulator plunger.

After removal of the proportioning-chamber housing 14 from the housing cover 13, one or more rupture joints 30 enable the housing cover 13 to be severed from its flange 31, thus rendering it unreliable for further coupling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A dosing chamber assembly for dispensing metered quantities of concentrate from a beverage concentrate container comprising:

a chamber housing having only two openings including an input opening communicating with a discharge opening of the container, and an output opening, said input opening of said chamber housing being disposed at the top thereof concentric with the longitudinal axis thereof whereby said chamber housing meters a predetermined volume of beverage concentrate; and a sliding control valve displaceable in the chamber housing to alternately open and close the input and output openings of the chamber housing, said sliding control valve including a tubular slide and a sealing element thereon which opens and closes said input opening and seals off the entire chamber housing from the interior of said container and the atmosphere, thereby preventing fluctuations in said predetermined volume of beverage concentrate.

2. The apparatus of claim 1 wherein said sliding control valve includes guide ribs extending upwardly from said disc into the input opening of said chamber housing, said guide ribs slidably engaging walls of said input opening.

3. The apparatus of claim 2 further including longitudinally-directed guide ribs between an outer wall of said tubular slide and an inner wall of said chamber housing.

4. The apparatus of claim 3 wherein said longitudinally-directed guide ribs are provided on said outer wall of said tubular slide.

5. The apparatus of claim 1 further including longitudinally-directed guide ribs between an outer wall of said tubular slide and an inner wall of said chamber housing.

6. The apparatus of claim 5 wherein said longitudinally-directed guide ribs are provided on said outer wall of said tubular side.

7. The apparatus of claim 1 wherein said input opening of said chamber housing is disposed in a housing cover which is detachably connected to said chamber housing.

8. The apparatus of claim 7 wherein interior walls of said housing cover are shaped in accordance with the volume of the liquid contained therein to be metered.

* * * * *